United States Patent
Hojo et al.

(10) Patent No.: US 8,648,701 B2
(45) Date of Patent: Feb. 11, 2014

(54) SADDLE RIDING VEHICLE

(75) Inventors: Masayuki Hojo, Wako (JP); Yoshiya Omuro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 254 days.

(21) Appl. No.: 13/190,484

(22) Filed: Jul. 26, 2011

(65) Prior Publication Data

US 2012/0025961 A1 Feb. 2, 2012

(30) Foreign Application Priority Data

Jul. 28, 2010 (JP) ................................. 2010-169475

(51) Int. Cl.
*B60R 25/10* (2013.01)

(52) U.S. Cl.
USPC ... 340/426.1; 340/427; 340/432; 340/693.11; 340/988; 224/413

(58) Field of Classification Search
None
See application file for complete search history.

(56) References Cited

U.S. PATENT DOCUMENTS

| | | | | |
|---|---|---|---|---|
| 4,163,513 A * | 8/1979 | Kramer | ......................... | 224/413 |
| 4,322,714 A * | 3/1982 | Morgan | ...................... | 340/427 |
| 4,641,124 A * | 2/1987 | Davis | ...................... | 340/426.23 |
| 4,929,925 A * | 5/1990 | Bodine et al. | ............ | 340/426.25 |
| 6,520,275 B2 * | 2/2003 | Galbraith et al. | ............. | 180/219 |
| 7,034,665 B2 * | 4/2006 | Kojika et al. | ................. | 340/427 |
| 2002/0113491 A1 * | 8/2002 | Eglit et al. | .................... | 307/9.1 |
| 2002/0145531 A1 * | 10/2002 | Delaney | ....................... | 340/689 |
| 2004/0036609 A1 * | 2/2004 | Kojika et al. | .............. | 340/572.8 |
| 2012/0187167 A1 * | 7/2012 | Salisbury | ...................... | 224/413 |

FOREIGN PATENT DOCUMENTS

JP 2002-362448 12/2002

\* cited by examiner

*Primary Examiner* — Benjamin C Lee
*Assistant Examiner* — Rajsheed Black-Childress
(74) *Attorney, Agent, or Firm* — Ditthavong Mori & Steiner, P.C.

(57) ABSTRACT

A saddle riding vehicle includes a storage box and an anti-theft system. The storage box is openable in a vehicle horizontal direction. The anti-theft system is configured to measure position information on the vehicle and to send the position information via radio, the anti-theft system being attached to an undersurface of a ceiling of the storage box. Preferably, the anti-theft system is rotatably attached to the undersurface of the ceiling of the storage box by a hinge and the anti-theft system is attached to the tray member.

19 Claims, 11 Drawing Sheets

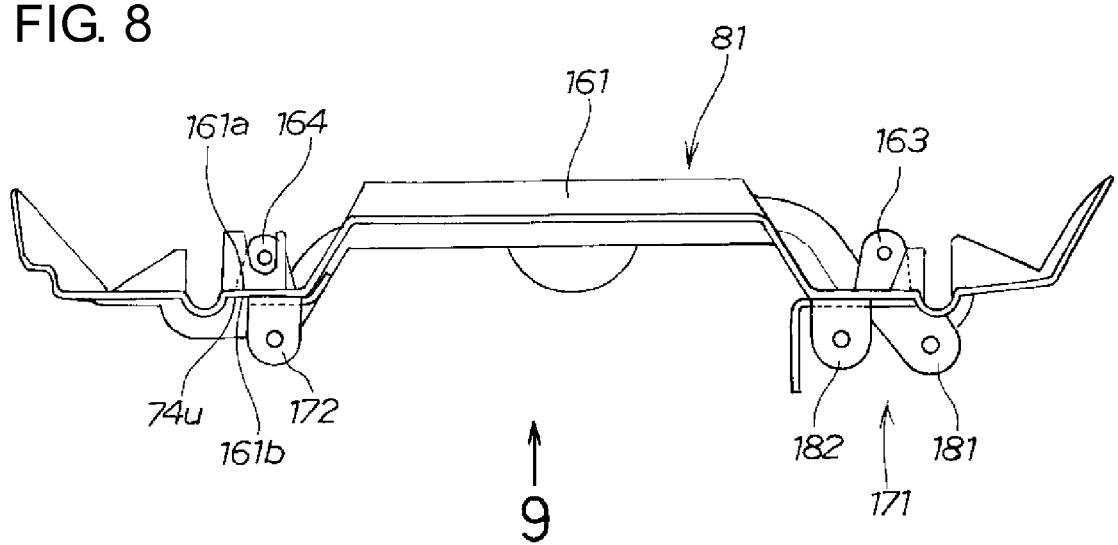

SADDLE RIDING VEHICLE

CROSS-REFERENCE TO RELATED APPLICATIONS

The present application claims priority under 35 U.S.C. §119 to Japanese Patent Application No. 2010-169475, filed Jul. 28, 2010. The contents of this application are incorporated herein by reference in their entirety.

BACKGROUND OF THE INVENTION

1. Field of the Invention

The present invention relates to saddle riding vehicle.

2. Discussion of the Background

There is an anti-theft system that includes a theft detecting sensor and an alarming device provided in a vehicle and is configured to cause the alarming device to make alarming sound when the vehicle is stolen. Moreover, there is an anti-theft system that includes a theft detecting sensor connected to an engine controller and configured to make an engine incapable of starting. Furthermore, an anti-theft system is known that includes a global positioning system (a GPS unit) and a cellular phone communication unit provided in a vehicle in addition to the above-mentioned elements. This anti-theft system causes the GPS unit to detect a position of the vehicle, and causes the cellular phone communication unit to send position information on the vehicle to a cellular phone or something similar (see Japanese Patent Application Publication No. 2002-362448 (FIGS. 2 and 4), for example).

In FIG. 2 of Japanese Patent Application Publication No. 2002-362448, a luggage box (hereinafter referred to as a storage box) whose upper portion is openably and closably covered with a seat is provided in a rear portion of a motorcycle. Two helmets can be stored in this storage box.

In FIG. 4 of Japanese Patent Application Publication No. 2002-362448, an anti-theft system is placed inside the storage box. Because this anti-theft system is placed between the two helmets, the anti-theft system is capable of being placed in the storage box without increasing the capacity of the storage box.

The technique described in Japanese Patent Application Publication No. 2002-362448 is that for placing the anti-theft system in the storage box which has an opening in its upper portion.

SUMMARY OF THE INVENTION

According to one aspect of the present invention, a saddle riding vehicle includes a storage box and an anti-theft system. The storage box is openable in a vehicle horizontal direction. The anti-theft system is configured to measure position information on the vehicle and to send the position information via radio, the anti-theft system being attached to an undersurface of a ceiling of the storage box.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8 is a side view of an intermediate member.

DESCRIPTION OF THE EMBODIMENTS

Figure 1:
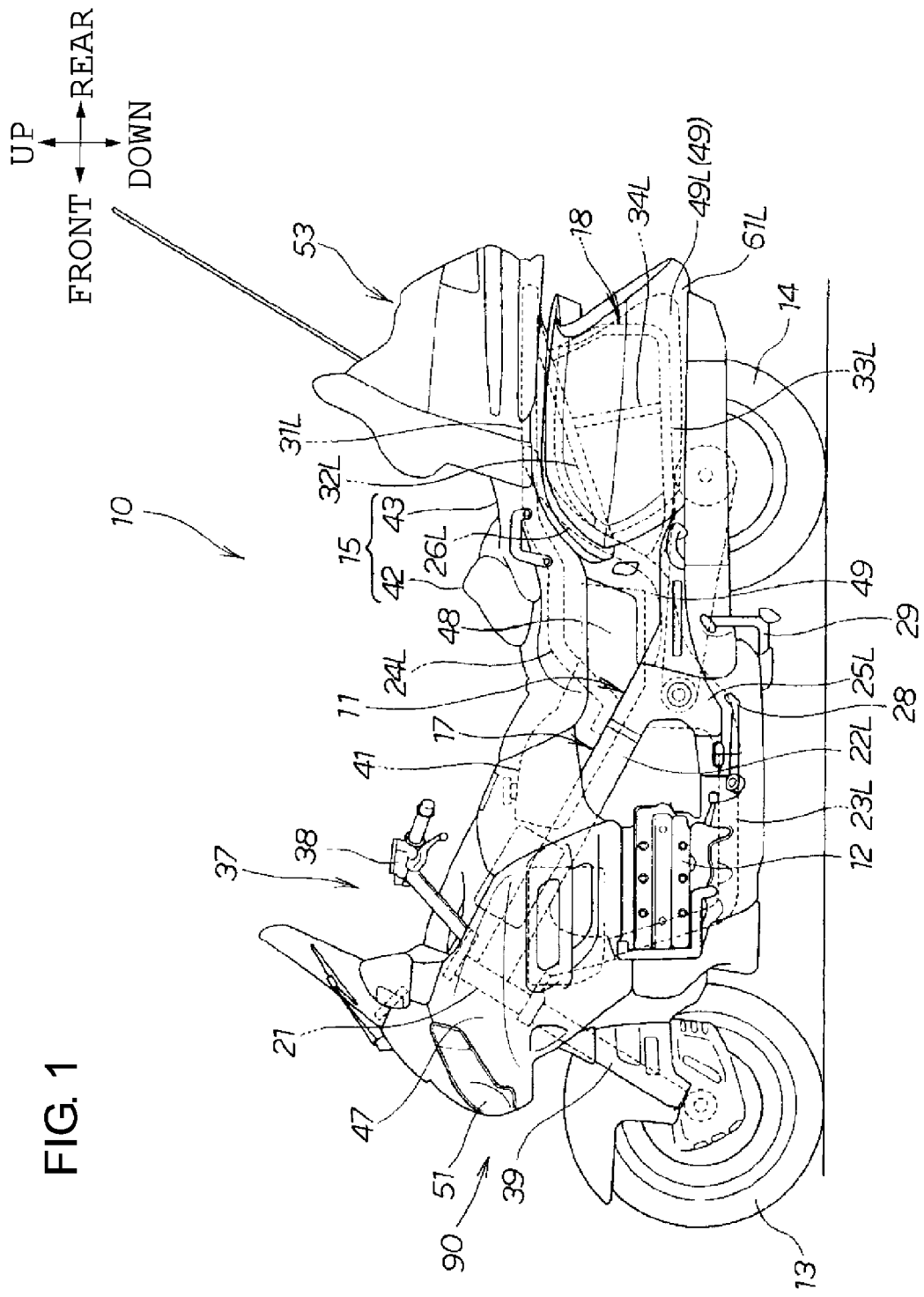
FIG. 1 is a left side view of a motorcycle of an embodiment of the present invention.

The embodiments will now be described with reference to the accompanying drawings, wherein like reference numerals designate corresponding or identical elements throughout the various drawings.

According to an embodiment of the present invention, a saddle riding-type vehicle equipped with an anti-theft system configured to measure position information on the vehicle, and to send this position information on the vehicle by radio, comprises a storage box openable in a vehicle horizontal direction, and the anti-theft system is attached to an undersurface of a ceiling of the storage box.

According to the embodiment, the saddle riding-type vehicle comprises the storage box openable in the vehicle horizontal direction, and the anti-theft system is attached to the undersurface of the ceiling of the storage box.

Because the anti-theft system is attached to the undersurface of the ceiling of the storage box, radio waves are received satisfactorily.

In addition, when items are stored in the storage box, a space is inevitably left above the items. The anti-theft system is installed in this space. This makes the items less likely to hit the anti-theft system, and thus makes a protective member, such as a protector, no longer necessary. Accordingly, the costs of the vehicle can be reduced.

As a consequence, the configuration of the embodiment of the present invention enhances the usability of the storage box. In addition, the anti-theft system can be disposed efficiently because the anti-theft system is disposed on the undersurface of the ceiling which is used less frequently.

In this case, the anti-theft system may be attached directly to the ceiling of the storage box by use of no hinge.

In the above-mentioned structure, preferably, the anti-theft system is rotatably attached to the undersurface of the ceiling of the storage box by use of a hinge.

In such case, the anti-theft system is rotatably attached to the undersurface of the ceiling of the storage box.

The anti-theft system has a bar code reader portion in its top surface. During the inspection process, predetermined bar code information corresponding to the vehicle body number of the vehicle needs to be read by the bar code reader portion.

In this respect, the embodiment of the present invention makes the anti-theft system rotatably attached to the ceiling of the storage box.

During an assembly process, the anti-theft system is attached to the storage box in a vertical posture while hung from the hinge. During the inspection process, the bar code reader portion in the top surface is made to read the bar code information. Thereafter, the anti-theft system is put in a horizontal posture by rotating the anti-theft system. Subsequently, an end of the anti-theft system which is the farther from the hinge is fixed to the ceiling.

Because the posture of the anti-theft system is changed in accordance with the progress of the assembly process in this manner, a desired productivity can be maintained in the assembly line without causing trouble while fitting the anti-theft system.

In this case, the anti-theft system may be attached to, for example, a frame member instead of the dish-shaped tray member.

In the above-mentioned structure, preferably, a dish-shaped tray member is rotatably attached to the undersurface of the ceiling of the storage box by use of the hinge, and the anti-theft system is attached to this tray member.

In such case, the tray member is rotatably attached to the ceiling of the storage box by use of the hinge, and the anti-theft system is attached to this tray member. Because the anti-theft system is attached to the tray member, the work of attaching the anti-theft system to the tray member is easier than the work of attaching the anti-theft system directly to the ceiling. In addition, because the hinge member is interposed between the ceiling and the tray member to which the anti-theft system is attached, the tray member to which the anti-theft system is attached can be attached to the ceiling easily.

Furthermore, no matter how the specification of the storage box is changed, the tray member can meet the change by simply modifying its size as long as the tray member has a dish-shaped simple structure to which the anti-theft system is attached. Accordingly, in the case where the anti-theft system is fixed to the ceiling by use of the tray member, the present invention can be applied to various types of storage boxes for a saddle riding-type vehicle which are openable in the vehicle horizontal direction, with a minimum increase in the vehicle costs.

In the above-mentioned structure, preferably, the anti-theft system put in a horizontal posture comprises an inspection-object portion in a top surface thereof, and is provided with the hinge in a rear portion of the anti-theft system in a vehicle longitudinal direction, and a pivot of the hinge extends in a vehicle width direction.

In such case, the hinge is provided in a rear portion of the anti-theft system, and the pivot of the hinge extends in the vehicle width direction.

When the hinge is provided in a rear portion of the anti-theft system and the anti-theft system is put in the vertical posture, the inspection-object portion provided in the top surface of the anti-theft system faces toward the vehicle front. This makes the inspection-object portion easily visible from the vehicle front, and accordingly makes it possible to inspect the anti-theft system easily.

In this case, it is possible to remove the screen member, which extends upward beyond the top surface of the anti-theft system, and increase the height of the wall portion by extending the wall portion upward, in a case where the tray member is attached to the undersurface of the ceiling.

In the above-mentioned structure, preferably, the tray member includes a screen member which extends toward the vehicle top beyond a top surface of the anti-theft system when the tray member is attached to the undersurface of the ceiling.

In such case, the tray member includes the screen member which extends toward the vehicle top beyond a top surface of the anti-theft system. Because the anti-theft system is hidden by the screen member when the anti-theft system is installed in the storage box, it is possible to prevent the anti-theft system from being tampered with. On the other hand, when the anti-theft system is put in the vertical posture, the inspection-object portion can be easily checked from the vehicle front. This enables the anti-theft system to be inspected easily although the screen member is provided there.

In the above-mentioned structure, preferably, the vehicle comprises a side stand, the storage box includes a left storage box and a right storage box which are respectively arranged on a right and left sides of the vehicle in the vehicle width direction, and the anti-theft system is arranged in one of the storage boxes on a side opposite to a side in which the side stand is provided.

In such case, the anti-theft system is arranged in the storage box on a side opposite to a side in which the side stand is provided.

The storage box on the side provided with the side stand is used more frequently than the storage box on the side provided with no side stand.

Because the anti-theft system is disposed in the storage box which is used less frequently, it is possible to secure a sufficient storage space for the storage box which is used more frequently, and this sufficiently-secured space can be used more effectively. As the whole of the storage box, the storage space can be used more efficiently.

Hereinafter, detailed descriptions will be provided for an embodiment of the present invention. In the drawings and an example, "up," "down," "front," "rear," "left," and "right" indicate the respective directions seen from a driver who rides on a motorcycle. Incidentally, the drawings should be looked at in a direction in which reference numerals therein are read normally.

Example

An example of the present invention will be described on the basis of the drawings.

As shown in FIG. 1, a motorcycle 10 includes: a vehicle body frame 11; an engine 12 hung from the vehicle body frame 11; a front wheel 13 and a rear wheel 14 provided respectively in front of, and in the rear of, this engine 12; and a seat 15 placed on the vehicle body frame 11 between the front wheel 13 and the rear wheel 14. The motorcycle 10 is a saddle-riding type vehicle designed for a rider to be seated on this seat 15 with the rider's leg straddled.

The vehicle body frame 11 of the motorcycle 10 includes: a vehicle body frame main body 17 and a rear vehicle body frame 18. The vehicle body frame main body 17 includes: a head pipe 21; paired left and right main frames 22L, 22R extended obliquely downward toward a vehicle tail from the head pipe 21; paired left and right down frames 23L, 23R extended downward from the head pipe 21, and subsequently extended toward the vehicle tail; paired left and right seat rails 24L, 24R extended from the rear end portions of the main frames 22L, 22R toward the vehicle tail; left and right center frames 25L, 25R respectively connecting the rear end portions of the main frames 22L, 22R to the rear end portions of the down frames 23L, 23R; and left and right sub-frames 26L, 26R extended obliquely upward backward from the left and right center frames 25L, 25R toward the rear end portions of the left and right seat rails 24L, 24R, and connected to the rear end portions of the left and right seat rails 24L, 24R. A side stand 28 is attached to the down frame 23L, and a main stand 29 is attached to the center frames 25L, 25R.

The rear vehicle body frame 18 includes: paired left and right upper pipes 31L, 31R extended from the rear end portions of the seat rails 24L, 24R toward the vehicle tail; paired left and right inclined pipes 32L, 32R extended rearward upward from the height-wise middle portions of the sub-frames 26L, 26R with the rear end portions of the left and right inclined pipes 32L, 32R connected to the upper pipes 31L, 31R; lower pipes 33L, 33R extended rearward from lower portions of the sub-frames 26L, 26R, thereafter extended upward, and connected to the inclined pipes 32L, 32R; and vertical pipes 34L, 34R laid between the inclined pipes 32L, 32R and the lower pipes 33L, 33R. Incidentally, FIG. 1 shows: only the main frame 22L, the down frame 23L, the seat rail 24L, the center frame 25L, the sub-frame 26L which are seen in this side of the drawing of the vehicle body frame main body 17; and only the upper pipe 31L the inclined pipe 32L, the lower pipe 33L and the vertical pipe 34L which are seen in the this side of the drawing of the rear vehicle body frame 18.

A steering system 37 for steering the front wheel 13 is rotatably supported by the head pipe 21. This steering system 37 has: a handlebar 38 in its upper portion; and a front fork 39 for supporting the front wheel 13 in its lower portion. The front wheel 13 is steerable by the operation of the handlebar 38. A fuel tank 41 is attached to the main frames 22L, 22R between the handlebar 38 and the riders' seat 15. The riders' seat 15 is formed of: a driver's seat 42 in its front portion; and a pillion seat 43 provided in the rear of the driver's seat and continuing from the driver's seat 42.

The engine 12 is hung from the main frames 22L, 22R and the down frames 23L, 23R under the fuel tank 41.

Next, descriptions will be provided for a vehicle body cover and the like for covering the vehicle body.

A vehicle body cover 46 includes: a front vehicle body cover 47 for covering a front portion of the vehicle body; a middle side cover 48 for covering a middle portion of the vehicle body from the lateral sides; and a rear side cover 49 continuing from the middle side cover 48, and extended toward the vehicle tail. A headlamp 51 is attached to the front vehicle body cover 47.

Next, descriptions will be provided for a configuration of the rear portion of the vehicle body.

Figure 2:
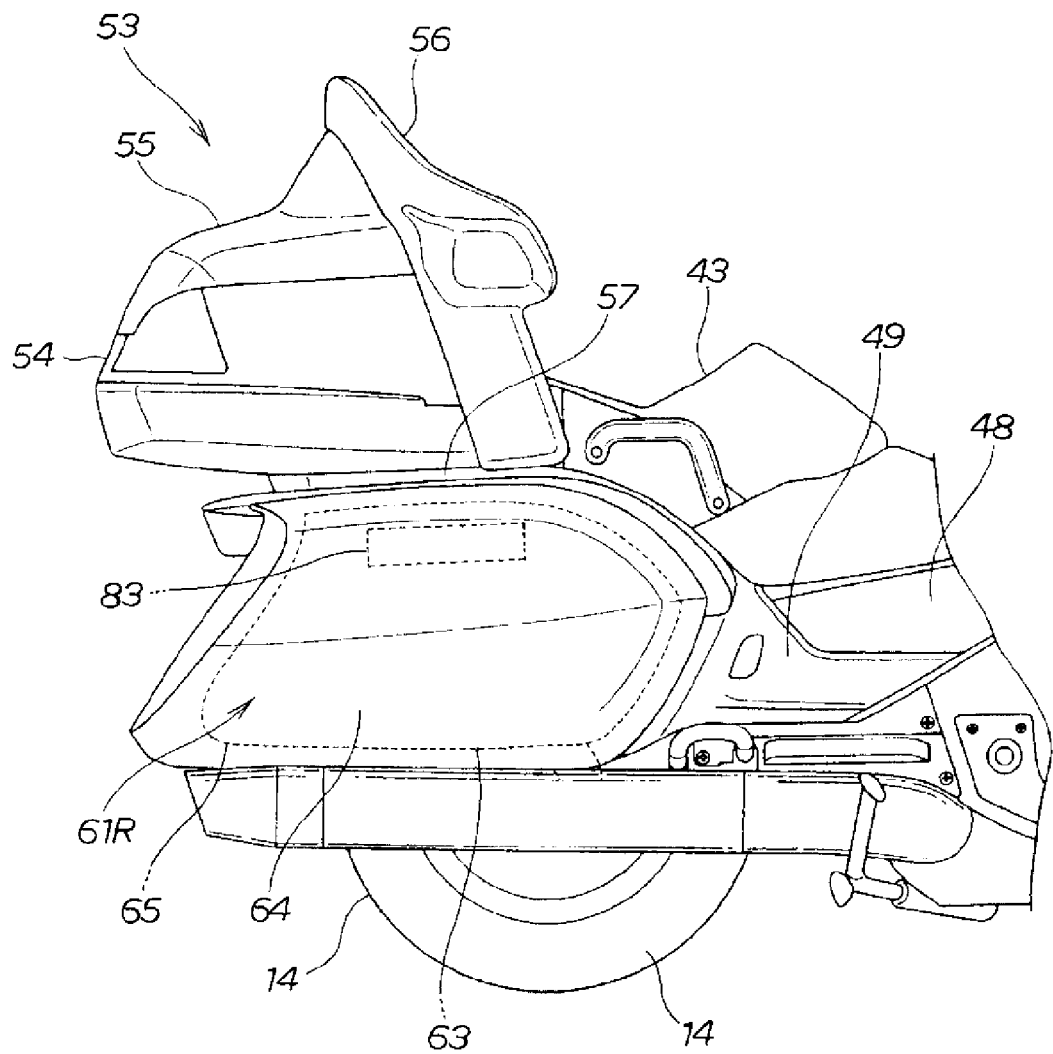
FIG. 2 is a right side view of a vehicle rear portion.

As shown in FIG. 2, the rear side cover 49 is provided rearward of the middle side cover 48 in the vehicle. The rear side cover 49 is extended rearward in a way that the rear side cover 49 smoothly continues from a rear portion of the middle side cover 48.

A center trunk 53 is provided in the rear of the pillion seat 43. The main members of the center trunk 53 include a trunk main body 54 and a lid portion 55 for covering the trunk main body 54. A back support 56 of the pillion seat 43 is provided on the front face of the lid portion 55. The lower portion of the trunk main body 54 is covered with a rear center cover 57. The rear center cover 57 is extended in the front-rear direction of the vehicle in a way that the rear center cover 57 continues from an upper portion of the rear side cover 49.

Referring also to FIG. 1, left and right storage boxes 61L, 61R are provided in portions which are under the center trunk 53, are leftward and rightward thereof in the vehicle width direction, and are under the rear side cover 49. The left and right sides of the rear wheel 14 are covered with the left and right storage boxes 61L, 61R, respectively. In other words, the storage boxes 61 include the left storage box 61L and the right storage box 61R which are arranged on left and right sides of the vehicle in its width direction, respectively. The storage boxes 61L, 61R project further than the center trunk 53 and the seat 15 in the vehicle width direction, and are arranged on the lateral sides of the rear wheel 14.

The main members of the right storage box 61R include a storage box main body 63 (indicated by a dashed line), and an opening/closing lid 64 for making this storage box main body 63 capable of opening and closing. The storage box main body 63 is attached to the lower pipe 33R by bolt-fastening or the like. The storage box main body 63 has an opening 65 which is directed toward the outside of the vehicle. A lower portion of the opening/closing lid 64 is rotatably supported by the storage box main body 63. Thus, the opening/closing lid 64 opens the opening 65 toward the outside of the vehicle, and covers the opening 65 from the outside in the vehicle width direction. Incidentally, the left storage box is configured in the same manner.

Figure 3:
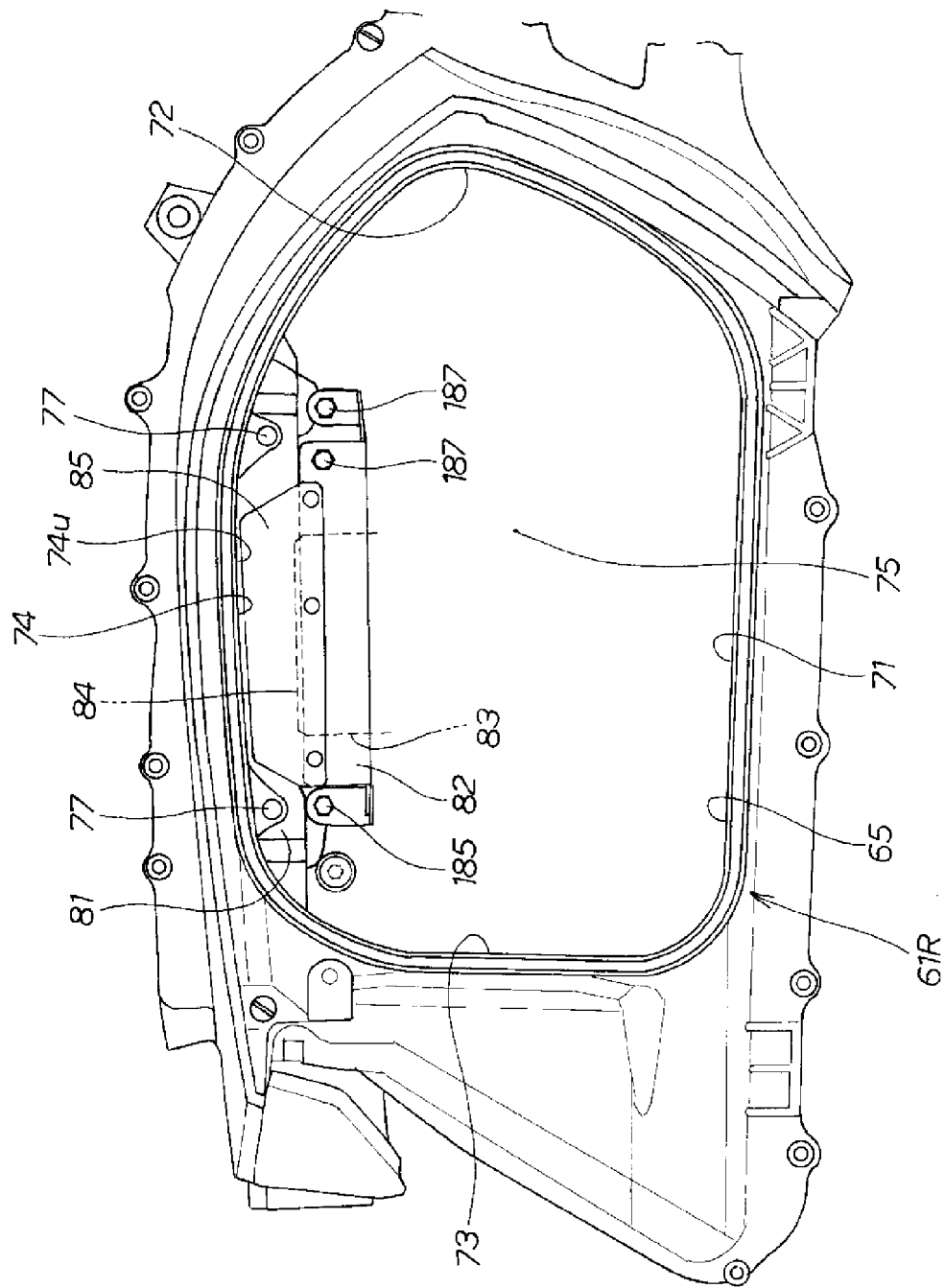
FIG. 3 is a right side view of a right storage box provided in the vehicle rear portion.

As shown in FIG. 3, the right storage box 61R from which the opening/closing lid (denoted by reference numeral 64 in FIG. 2) is removed includes: a bottom portion 71; a front wall 72 standing up from a front portion of the bottom portion 71; a rear wall 73 standing up from a rear portion of the bottom portion 71; a ceiling 74 laid between the front wall 72 and the rear wall 73; and an inner wall 75 laid among the vehicle width-wise middle sides of the bottom portion 71, the front wall 72, the rear wall 73 and the ceiling 74, respectively. The right storage box 61R has the opening 65 on the right side of the vehicle. The storage box 61R (61) is made of a resin.

An intermediate member 81 is attached to an undersurface 74u of the ceiling 74 by use of fastening members 77, 77 in a way that the intermediate member 81 extends in a longitudinal direction of the vehicle. A tray member 82 is attached to this intermediate member 81. An anti-theft system 83 is attached to this tray member 82.

The tray member 82 is furnished with a screen member 85 which is designed to extend toward the vehicle top beyond a top surface 84 of the anti-theft system when the tray member 82 is attached to the undersurface 74u of the ceiling.

Incidentally, the screen member 85 may be provided integrally with the tray member 82, or separately from the tray member 82.

The anti-theft system 83 is housed in the right storage box 61R which is arranged on the right side in the vehicle width direction. On the other hand, as shown in FIG. 1, the side stand 28 is arranged on the left side in the vehicle width direction.

In other words, the anti-theft system 83 is disposed in the storage box 61R (the right storage box 61R) on the right side which is opposite to a side in which the side stand 28 is provided.

Next, descriptions will be provided for a block diagram of the anti-theft system and its vicinity while also referring to FIG. 1.

Figure 4:
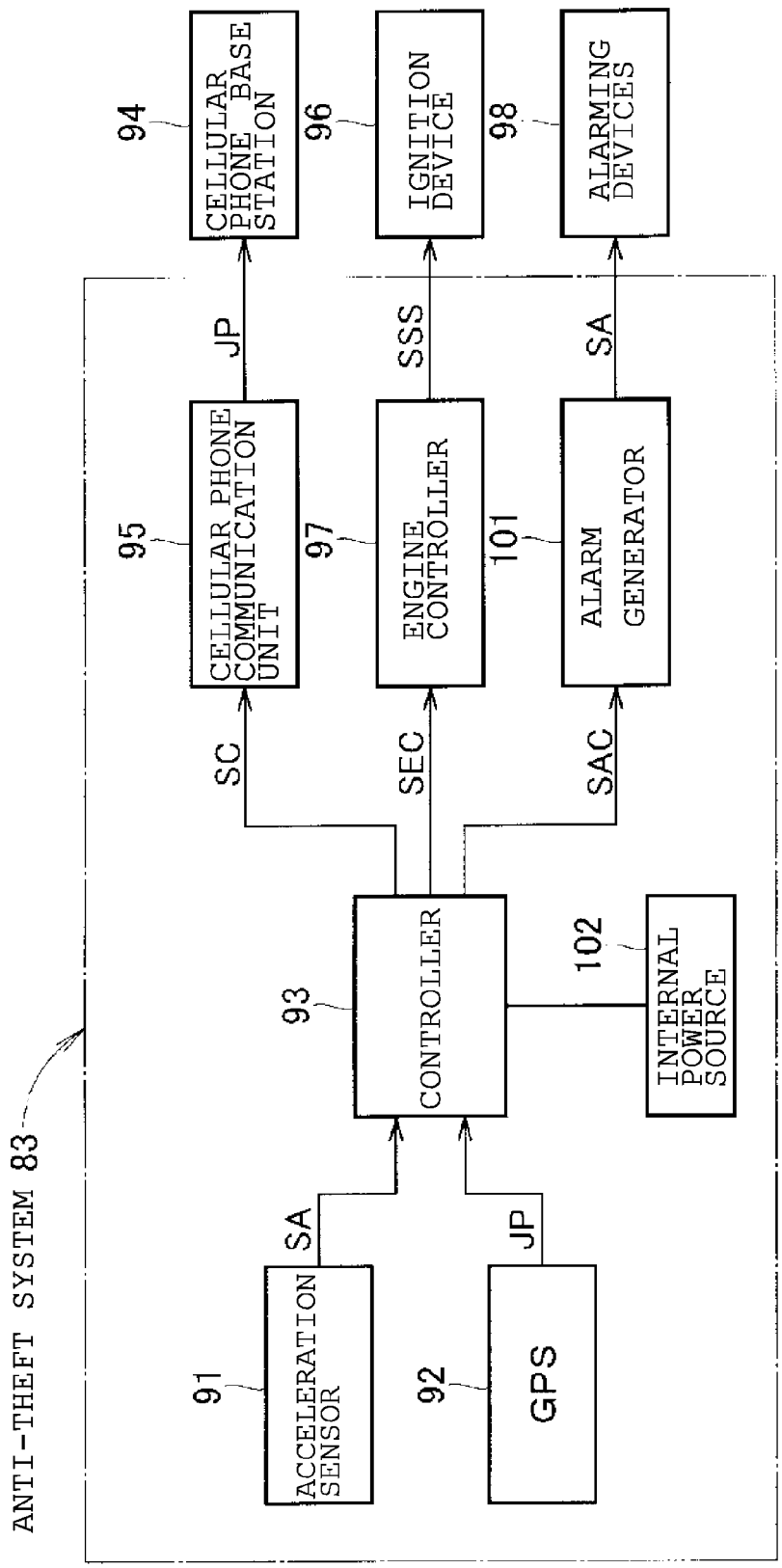
FIG. 4 is a block diagram of an anti-theft system installed in the motorcycle and its vicinity.

As shown in FIG. 4, the anti-theft system 83 includes: an acceleration sensor 91 for detecting vibrations to be applied to the vehicle body of the saddle riding-type vehicle (the motorcycle 10); a global positioning system 92 for detecting the current position of the vehicle by receiving information on the orbits of the respective multiple artificial satellites; a controller 93 for instructing anti-theft measures upon reception of an acceleration signal SA from the acceleration sensor 91 and positional information JP from the global positioning system 92; a cellular phone communication unit 95 for sending the positional information JP to a cellular phone base station 94 on the basis of a communication instruction SC from the controller 93; an engine controller 97 for stopping the operation of an ignition device 96 of the engine 12, that is to say, for stopping the engine 12, by sending an ignition stopping signal SSS to the ignition device 96 on the basis of an engine controlling signal SEC from the controller 93; an alarm generator 101 for sending an alarm signal SA to alarming devices 98 (including the lighting devices 99 such as the headlamp 51 and turn indicator lights, and a horn) on the basis of an alarm controlling signal SAC from the controller 93, and thus activating the lighting devices 99 and the horn; and an internal power source 102. For example, a lithium battery is used as the internal power source 102.

Detailed descriptions will be hereinbelow provided for an attachment structure of the anti-theft system.

Next, descriptions will be provided for the tray member to which the anti-theft system is to be attached.

Figure 5:
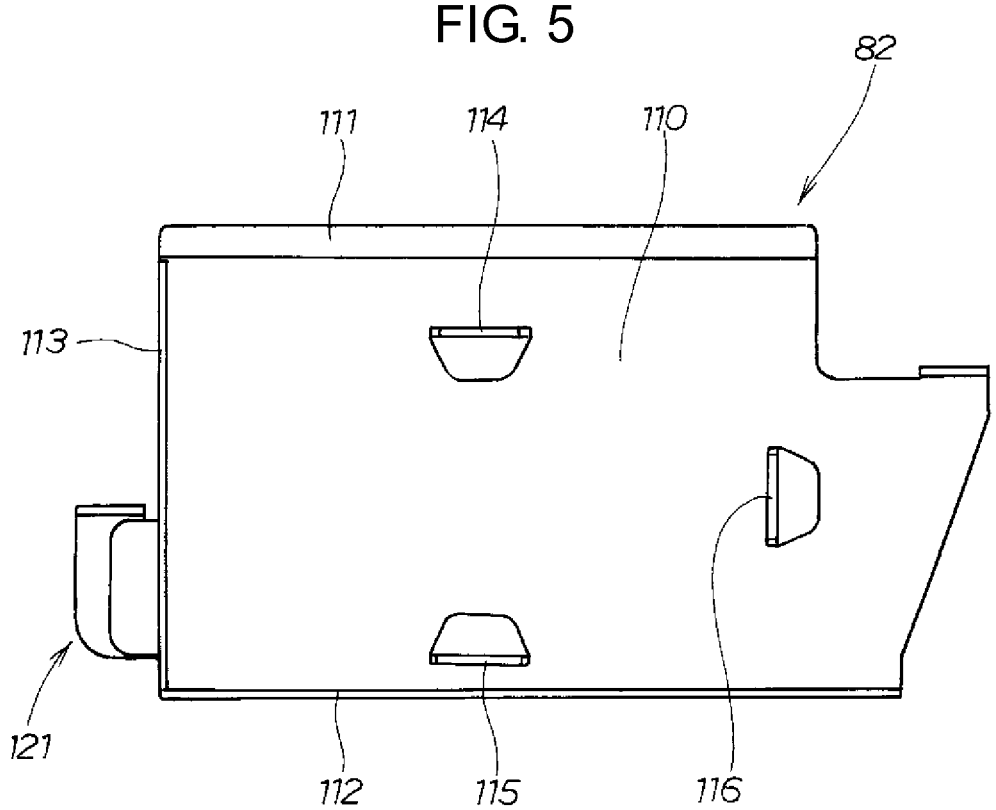
FIG. 5 is a block diagram of a tray member.

As shown in FIG. 5, the tray member 82 includes: a bottom plate 110; a first wall 111 to a third wall 113 extended upward from the respective edges of this bottom plate 110; and a first protrusion 114 to a third protrusion 116 which is annexed to the bottom plate 110 and extended upward, and to which the anti-theft system (denoted by reference numeral 83 in FIG. 3) is fixed.

A tray hinge 121 is annexed to an outer portion of the third wall 113 which is situated closest to the vehicle tail among the first wall 111 to the third wall 113.

Next, descriptions will be provided for a structure with which the anti-theft system is attached to the tray member and the like.

Figure 6:
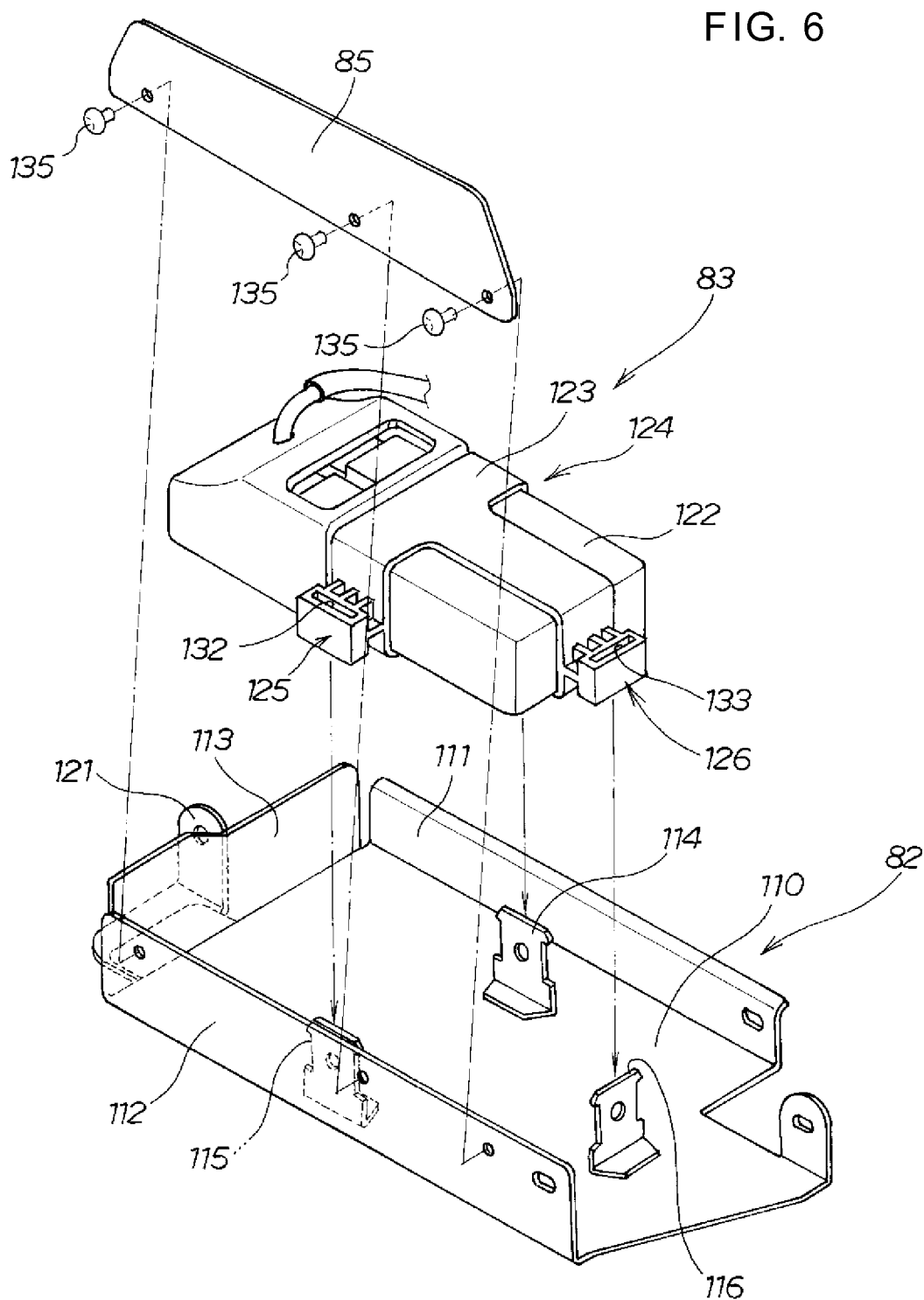
FIG. 6 is a perspective view for explaining an attachment structure of the anti-theft system.

As shown in FIG. 6, the anti-theft system 83 is encased in a case body 122 shaped like a box. This case body 122 is covered with an elastic member 123 vertically and horizontally. A first projecting portion 124 to a third projecting portion 126 are provided to this elastic member 123. A first engagement hole 131 to a third engagement hole 133 are provided in the first projecting portion 124 to the third projecting portion 126 at such positions that the first protrusion 114 to the third protrusion 116 can engage with the first engagement hole 131 to the third engagement hole 133, respectively.

As described above, the first protrusion 114 to the third protrusion 116 are extended from the bottom plate 110 of the tray member 82 in a manner projecting upward. Thus, the anti-theft system 83 is attached to the tray member 82 by fitting the first engagement hole 131 to the third engagement hole 133 of the elastic member holding the case body 122 in the surrounding manner to the first protrusion 114 to the third protrusion 116, respectively.

The screen member 85 is attached to the second wall 112, which is situated outermost in the vehicle width direction among the first wall 111 to the third wall 113 by use of multiple rivets 135.

Next, detailed descriptions will be provided for the case body and the elastic member of the anti-theft system.

Figure 7A:
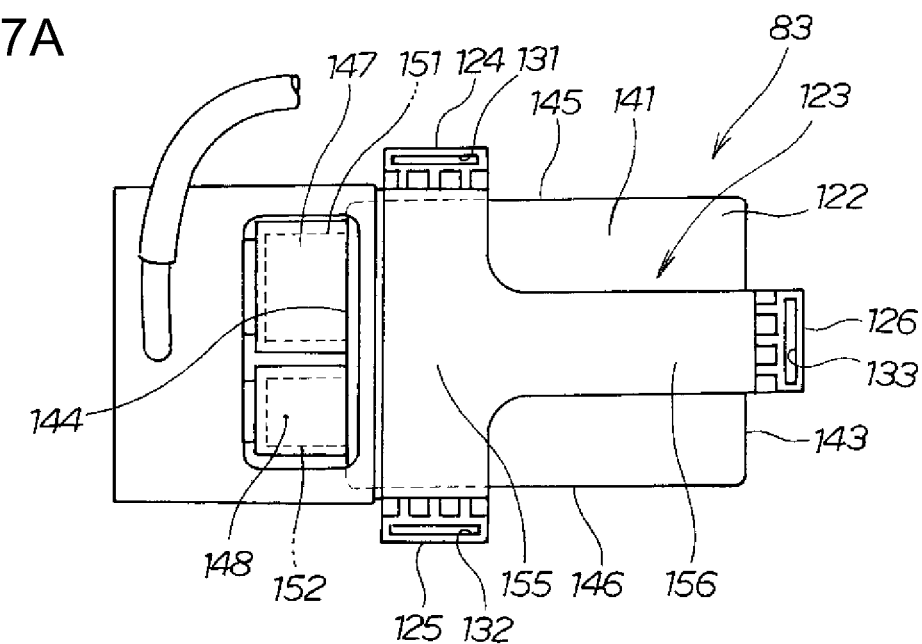
FIG. 7A, FIG. 7B and FIG. 7C include explanatory diagrams showing the anti-theft system and its associated parts.
Figure 7B:
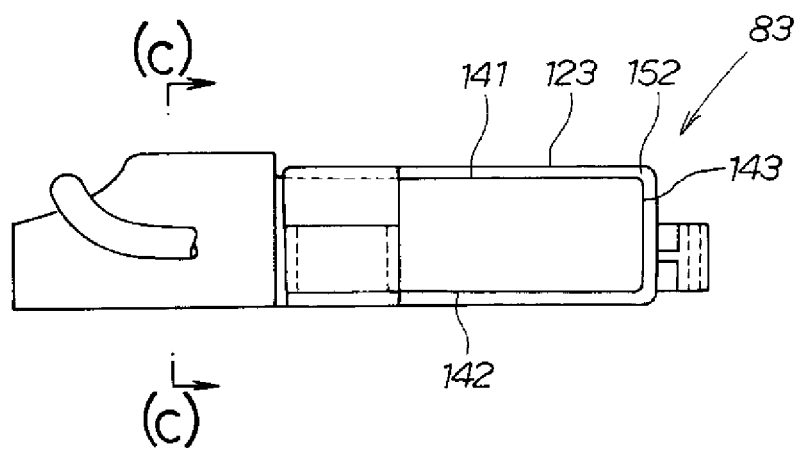

FIG. 7A shows a plan view of the anti-theft system 83. FIG. 7B shows a view taken in the direction of arrow (b) in FIG. 7A.

The case body 122 of the anti-theft system is a cuboid box-shaped member including a top surface 141, an undersurface 142, a front surface 143, a rear surface 144, a left surface 145 and a right surface 146. Terminal portions 151, 152 to which respective connectors 147, 148 are connected are provided to the rear surface 144.

The elastic member 123 is a member formed of: a first holding portion 155 surrounding the left surface 145, the right surface 146, the top surface 141 and the undersurface 142 of the case body 122; and a second holding portion 156 extended frontward from the this first holding portion 155 and surrounding the top surface 141, the front surface 143, the undersurface 142 of the case body 122.

The first projecting portion 124 having the first engagement hole 131 is provided to the first holding portion 155 at a position corresponding to the left surface 145. The second projecting portion 125 having the second engagement hole 132 is provided to the first holding portion 155 at a position corresponding to the right surface 146. The third projecting portion 126 having the third engagement hole 133 is provided to the second holding portion 156 at a position corresponding to the front surface 143.

Because the case body 122 is covered with and arrested by the elastic member 123 including the first engagement hole 131, the second engagement hole 132 and the third engagement hole 133, vibrations of the vehicle are absorbed by this elastic member 123. This makes it hard for the vibrations of the vehicle to be transmitted to the anti-theft system 83.

Figure 7C:
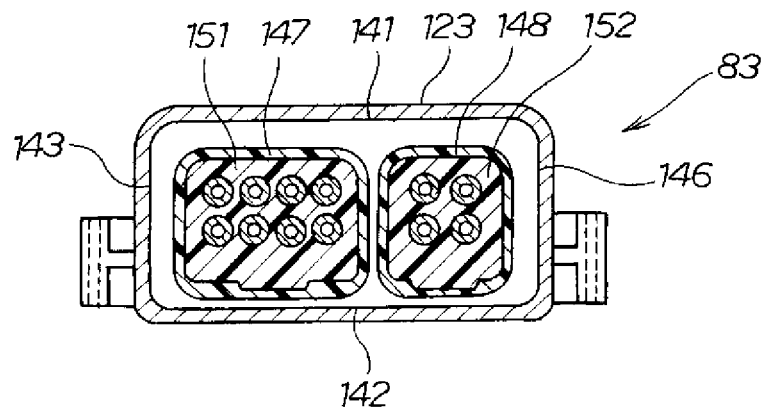

FIG. 7C shows a cross-sectional view of the anti-theft system taken along the (c)-(c) line of FIG. 7B. The terminal portions 151, 152 to which the connectors 147, 148 are connected are provided to the rear surface of the anti-theft system 83.

Descriptions will be provided for the intermediate member interposed between the storage box and the tray member.

As shown in FIG. 8, the intermediate member 81 is a dish-shaped member extending horizontally in the vehicle longitudinal direction, and having a curved surface. A plate portion 161 as well as front and rear seat portions 163, 164 is formed in the intermediate member 81. The front and rear seat portions 163, 164 project upward from front and rear portions of a top surface 161a of the plate portion 161, and are attached to the undersurface (denoted by reference numeral 74u in FIG. 3) of the ceiling of the storage box (denoted by reference numeral 61R in FIG. 3).

A lock unit (not illustrated) for enabling the opening/closing lid (denoted by reference numeral 64 in FIG. 2) of the storage box 61R to be locked is arranged between the intermediate member 81 and the undersurface 74u of the ceiling of the storage box. In other words, the intermediate member 81 may be termed as a lock unit cover.

A ceiling fixing stay 171 is attached to an undersurface 161b of the plate portion 161 at a position corresponding to the front seat portion 163 in the vehicle longitudinal direction. Similarly, an upper hinge 172 is attached to the undersurface 161b at a position corresponding to the rear seat portion 164 in the vehicle longitudinal direction.

Next, descriptions will be provided for members to be attached to an undersurface of the intermediate member.

Figure 9:
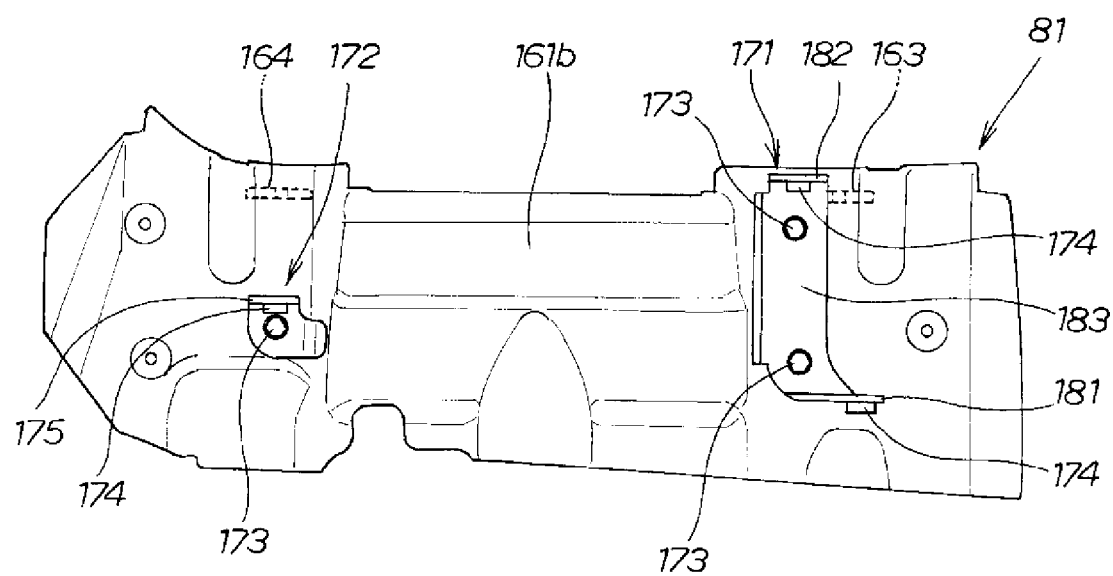
FIG. 9 is a view of the intermediate member in a direction indicated by an arrow 9 of FIG. 8.

As shown in FIG. 9, the upper hinge 172 is fastened to the undersurface 161b of the intermediate member by use of bolts 173. A hinge piece 175 is provided to this upper hinge 172 in a manner projecting downward. The hinge piece 175 is shaped like the letter L when viewed from the vehicle front, and a welded nut 174 is fixedly attached to the hinge piece 175. The upper hinge 172 rotatably supports a rear portion of the tray member (denoted by reference numeral 82 in FIG. 6).

The ceiling fixing stay 171 is fastened to the undersurface 161b of the intermediate member at a position closer to the vehicle front than the upper hinge 172 by use of the bolts 173, 173. This ceiling fixing stay 171 is formed of a first fixing piece 181, a second fixing piece 182 and a seat plate 183. Each of the first fixing piece 181 and the second fixing piece 182 has a cross section shaped almost like the letter U when viewed from the vehicle front, and a welded nut 174 is fixedly attached thereto. The seat plate 183 is laid between the first fixing piece 181 and the second fixing piece 182, and is fixed to the undersurface 161b of the intermediate member. Both the first fixing piece 181 and the second fixing piece 182 project downward. The first fixing piece 181 and the second fixing piece 182 are used to fix a front portion of the tray member 82 to the undersurface of the ceiling. The second fixing piece 182 is provided at a position which is closer to the outside in the vehicle width direction than the first fixing piece 181 and which is closer to the vehicle tail in the vehicle longitudinal direction than the first fixing piece 181. Fastening members (denoted by reference numerals 187, 187 in FIG. 10) are respectively screwed into the first fixing piece 181 and the second fixing piece 182 from the outside to the inside of the vehicle. Because a tool can be applied to the fastening members from the outside of the vehicle, desirable workability can be secured. The intermediate member 81 is made of resin. The upper hinge 172 and the ceiling fixing stay 171 are made of metal.

Figure 10:
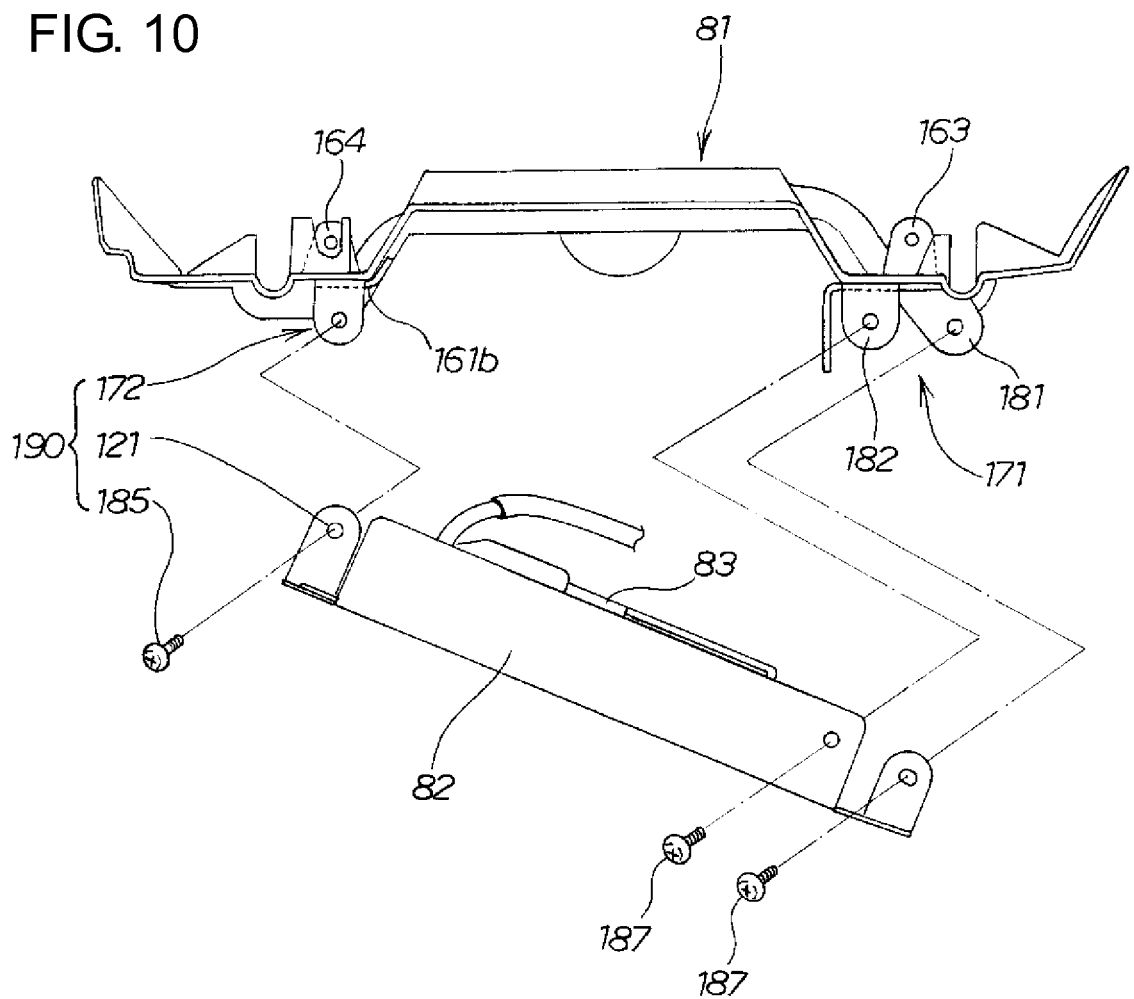
FIG. 10 is an exploded perspective view for explaining how the tray member is attached to the intermediate member.

As shown in FIG. 10, the dish-shaped tray member 82 is rotatably attached to the intermediate member 81, which is attached to the undersurface (denoted by reference numeral 74u in FIG. 3) of the ceiling of the storage box, by use of a hinge 190. The anti-theft system 83 is attached to this tray member 82.

The hinge 190 is formed of: the tray hinge 121 annexed to the tray member 82; the upper hinge 172 attached to the undersurface 161b of the intermediate member; and a fastening member 185 for rotatably supporting the tray member 82 to the intermediate member 81 while concurrently functioning as a hinge shaft to be penetrated through the upper hinge 172 and the tray hinge 121 in the vehicle width direction.

The foregoing configuration makes it possible for the anti-theft system 83 attached to the tray member 82 to be rotatably attached to the undersurface 74u of the ceiling of the storage box by use of the hinge 190. While the tray member 82 is held horizontally in order to make the posture of the anti-theft system 83 keep a horizontal posture, the anti-theft system 83 is fixed in the horizontal posture by fastening the front end portion of the tray member 82 to the first fixing piece 181 and the second fixing piece 182 included in the ceiling fixing stay 171 attached to the undersurface 161b of the intermediate member by use of the fastening members 187, 187.

Next, descriptions will be provided for how the above-described attachment structure of the anti-theft system works.

Figure 11:
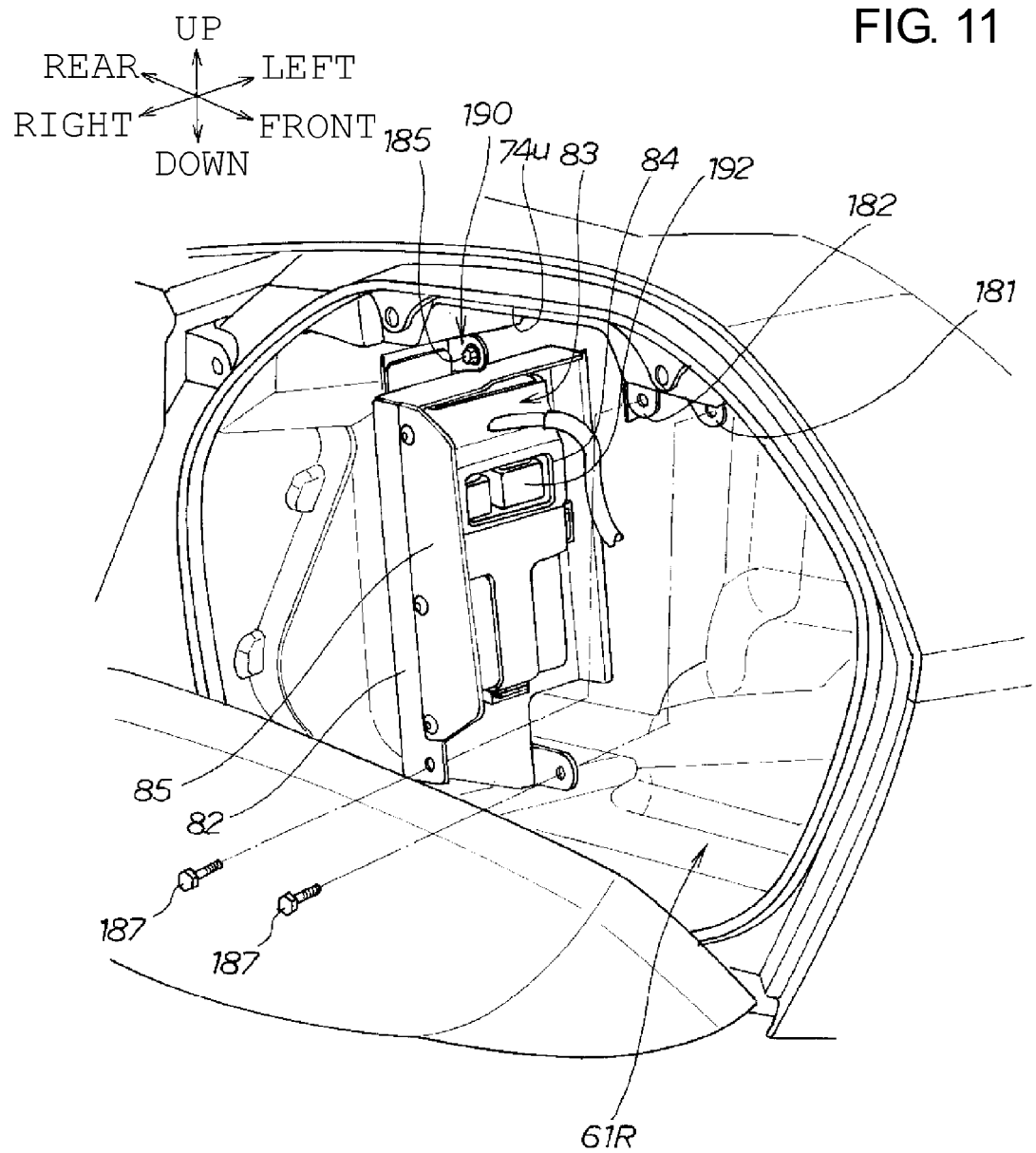
FIG. 11 is a perspective view for explaining the anti-theft system in a vertical posture.

FIG. 11 shows a state in which: the tray member to which the anti-theft system has been attached is attached to the hinge, but not attached to the first fixing piece or the second fixing piece; and accordingly is put in the vertical posture.

The hinge 190 is provided in a rear portion of the anti-theft system 83 in the vehicle longitudinal direction. The hinge shaft (the fastening member 185) being a rotation shaft of the hinge 190 extends in the vehicle width direction.

The anti-theft system 83 has an inspection-object portion 192 in its top surface 84. The anti-theft system 83 takes the vertical posture in a case where the rear portion of the tray member 82 is rotatably supported by the hinge 190 while the front portion of the tray member 82 is not fastened.

The anti-theft system 83 has a bar code reader portion 192 (the inspection-object portion 192) in its top surface 84. Predetermined bar code information corresponding to the vehicle body number of the vehicle needs to be read by the bar code reader portion 192 during the inspection process.

In the embodiment of the present invention, the anti-theft system 83 is rotatably attached to the undersurface 74u of the ceiling of the storage box. During the assembly process, the anti-theft system 83 is attached to the storage box in such a vertical posture that the anti-theft system 83 is hung from the hinge 190.

When the hinge 190 is provided in the rear portion of the anti-theft system 83 and the anti-theft system 83 is put in the vertical posture, the inspection-object portion 192 provided in the top surface 84 of the anti-theft system faces toward the vehicle front. This makes the inspection-object portion 192 easily visible from the vehicle front, and enables an inspection apparatus or the like to be applied to this inspection-object portion 192. Accordingly, this makes it possible to inspect the anti-theft system 83 easily.

Referring to both FIG. 3 and FIG. 10, after the bar code information is read by the bar code reader portion 192 in the top surface 84 of the anti-theft system during the inspection process, the anti-theft system 83 is rotated, and the anti-theft system 83 is thereby put in the horizontal posture. Subsequently, an end (front end portion) of the anti-theft system which is the farthest from the hinge 190 is fixed to the undersurface 74u of the ceiling by use of the fastening members 187, 187.

Because, the posture of the anti-theft system 83 is changed in accordance of the progress of the assembly process as described above, a desired productivity can be maintained in the assembly line without causing trouble in the assembly of the anti-theft system 83.

The motorcycle 10 is equipped with the storage box 61R which is opened in the vehicle horizontal direction. The anti-theft system 83 is attached to the undersurface 74u of the ceiling of this storage box.

No large difference exists in terms of the space for storing items between the case where the anti-theft system 83 is attached to the undersurface 74u of the ceiling of the storage box and the case where the anti-theft system 83 is attached to the bottom surface of the storage box, except that the arrangement of the anti-theft system is different. Nevertheless, no matter which case is the arrangement of the anti-theft system in the storage box, items to be stored are usually stored while being stacked upward from the bottom surface of the storage box. For this reason, the items can be stored in the storage box more easily, and the usability of the storage box accordingly becomes better, when the anti-theft system is attached to the undersurface of the ceiling of the storage box.

In sum, when the anti-theft system 83 is disposed on the undersurface 74u of the ceiling of the storage box 61R like in the embodiment of the present invention, the usability of the storage box 61R can be enhanced. In addition, the efficient arrangement of the anti-theft system 83 can be achieved by arranging the anti-theft system 83 in a space near the undersurface 74u of the ceiling which is used less frequently.

Referring to FIG. 10 and FIG. 11, the tray member 82 is rotatably attached to the undersurface 74u of the ceiling of the storage box 61R by use of the hinge 190, and the anti-theft system 83 is attached to this tray member 82.

Because the anti-theft system 83 is attached to the tray member 82, the work of attaching the anti-theft system 83 to the tray member 82 is easier than the work of attaching the anti-theft system 83 directly to the ceiling. In addition, because the hinge 190 is interposed between the undersurface 74u of the ceiling and the tray member 82 to which the anti-theft system 83 is attached, the tray member 82 to which the anti-theft system 83 is attached can be attached to the undersurface 74u of the ceiling easily.

Furthermore, no matter how the specification of the storage box 61R is changed, the tray member 82 can meet the change by simply modifying its size as long as the tray member 82 has the dish-shaped simple structure to which the anti-theft system 83 is attached. Accordingly, in the case where the anti-theft system 83 is fixed to the ceiling by use of the tray member 82, the present invention can be applied to various types of storage boxes for a saddle riding-type vehicle which are openable in the vehicle horizontal direction, with a minimum increase in the vehicle costs.

Returning back to FIG. 3, the tray member 82 includes the screen member 85 which extends toward the vehicle top beyond the top surface 84 of the anti-theft system. Because the anti-theft system 83 is hidden by the screen member 85 when the anti-theft system 83 is installed in the storage box 61R, it is possible to prevent the anti-theft system 83 from being tampered with. On the other hand, when, the anti-theft system 83 is put in the vertical posture as in FIG. 11, the inspection-object portion 192 can be easily checked from the vehicle front. This enables the anti-theft system 83 to be inspected easily although the screen member 85 is provided there.

Referring to FIG. 1 and FIG. 3, the anti-theft system 83 is disposed in the storage box 61R which is situated in a side opposite to a side provided with the side stand 28.

The left storage box 61L on the side provided with the side stand 28 is used more frequently than the right storage box 61R on the side provided with no side stand 28.

Because the anti-theft system 83 is disposed in the right storage box 61R which is used less frequently, it is possible to secure a sufficient storage space for the left storage box 61L which is used more frequently. Accordingly, as a whole of the storage box, the storage space can be used efficiently.

In the example of the present invention, the present invention is applied to the storage box which is openable toward the vehicle lateral sides. It should be noted, however, that the present invention can be applied to a storage box which is openable toward the vehicle tail, such as a center trunk which is arranged in the center position in the vehicle width direction.

The present invention is applied to the motorcycle in the embodiment. It should be noted, however, that the present invention can be applied to rough terrain vehicles (three-wheel buggies, four-wheel buggies) and the like being saddle-riding type vehicles. The present invention may be applied to regular vehicles.

The present invention is preferably suitable for motorcycles equipped with a storage box which has an opening directed in the vehicle horizontal direction.

Obviously, numerous modifications and variations of the present invention are possible in light of the above teachings. It is therefore to be understood that within the scope of the appended claims, the invention may be practiced otherwise than as specifically described herein.

What is claimed is:

1. A saddle riding vehicle comprising:
   a storage box openable in a vehicle horizontal direction; and
   an anti-theft system configured to measure position information on the vehicle and to send the position information via radio, the anti-theft system being attached to an undersurface of a ceiling of the storage box,
   wherein the anti-theft system is rotatably attached to the undersurface of the ceiling of the storage box by a hinge.
2. The saddle riding vehicle according to claim 1, wherein
   a dish-shaped tray member is rotatably attached to the undersurface of the ceiling of the storage box by the hinge, and
   the anti-theft system is attached to the tray member.
3. The saddle riding vehicle according to claim 1, wherein
   the anti-theft system put in a horizontal posture comprises an inspection-object portion in a top surface of the anti-theft system, and is provided with the hinge in a rear portion of the anti-theft system in a vehicle longitudinal direction, and
   a pivot of the hinge extends in a vehicle width direction.
4. The saddle riding vehicle according to claim 2, wherein
   the tray member includes a screen member which extends toward the vehicle top beyond a top surface of the anti-theft system when the tray member is attached to the undersurface of the ceiling.
5. The saddle riding vehicle according to claim 1, wherein the vehicle further comprises a side stand,
   the storage box includes a left storage box and a right storage box which are respectively arranged on right and left sides of the vehicle in a vehicle width direction, and
   the anti-theft system is arranged in one of the storage boxes on a side opposite to a side in which the side stand is provided.
6. The saddle riding vehicle according to claim 2, wherein
   an intermediate member is attached to the undersurface of the ceiling and the tray member is attached to the intermediate member.
7. The saddle riding vehicle according to claim 2, wherein
   an intermediate member is attached to the undersurface of the ceiling so that the intermediate member extends in a longitudinal direction of the vehicle.
8. The saddle riding vehicle according to claim 4, wherein the screen member is provided integrally with the tray member.
9. The saddle riding vehicle according to claim 4, wherein the screen member is provided separately with the tray member.
10. The saddle riding vehicle according to claim 1, wherein the anti-theft system is covered with an elastic member.
11. The saddle riding vehicle according to claim 10, wherein
    the anti-theft system is encased in a case body shaped like a box, and
    the case body is covered with the elastic member.
12. The saddle riding vehicle according to claim 11, wherein
    a first projecting portion, a second projecting portion and a third projecting portion are provided to the elastic member, and
    a first engagement hole, a second engagement hole and a third engagement hole are provided in the first projecting portion, the second projecting portion the third projecting portion respectively.
13. The saddle riding vehicle according to claim 12, wherein
    the case body is a cuboid box-shaped member including a top surface, an undersurface, a front surface, a rear surface, a left surface and a right surface of the case body.
14. The saddle riding vehicle according to claim 13, wherein
    the elastic member is a member formed of a first holding portion surrounding the left surface, the right surface, the top surface and the undersurface of the case body and a second holding portion extended frontward from the first holding portion and surrounding the top surface, the front surface, the undersurface of the case body.
15. The saddle riding vehicle according to claim 14, wherein
    the first projecting portion is provided to the first holding portion at a position corresponding to the left surface of the case body,
    the second projecting portion is provided to the first holding portion at a position corresponding to the right surface of the case body, and
    the third projecting is provided to the second holding portion at a position corresponding to the front surface of the case body.
16. The saddle riding vehicle according to claim 12, wherein
    a terminal portion to which a connector is connected is provided to a rear surface of the anti-theft system.
17. The saddle riding vehicle according to claim 6, wherein an upper hinge is fastened to an undersurface of the intermediate member.

18. The saddle riding vehicle according to claim 17, wherein the hinge by which the anti-theft system is rotatably attached to the undersurface of the ceiling of the storage box is formed of a tray hinge annexed to the tray member, the upper hinge, and a fastening member for rotatably supporting the tray member to the intermediate member.

19. The saddle riding vehicle according to claim 17, wherein a ceiling fixing stay is fastened to the undersurface of the intermediate member at a position closer to a front of the vehicle than the upper hinge.

* * * * *